(12) United States Patent
Li et al.

(10) Patent No.: US 11,343,826 B2
(45) Date of Patent: May 24, 2022

(54) INFORMATION TRANSMISSION METHOD, TERMINAL DEVICE, AND NETWORK DEVICE

(71) Applicant: Huawei Technologies Co., Ltd., Shenzhen (CN)

(72) Inventors: Bingzhao Li, Beijing (CN); Yi Guo, Shenzhen (CN); Huiping Shan, Shenzhen (CN); Guangsheng Pan, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 16/832,405

(22) Filed: Mar. 27, 2020

(65) Prior Publication Data

US 2020/0229175 A1 Jul. 16, 2020

Related U.S. Application Data

(63) Continuation of application No. PCT/CN2018/105098, filed on Sep. 11, 2018.

(30) Foreign Application Priority Data

Sep. 28, 2017 (CN) .......................... 201710898879.X

(51) Int. Cl.
*H04L 5/00* (2006.01)
*H04L 1/00* (2006.01)
(Continued)

(52) U.S. Cl.
CPC ........ *H04W 72/048* (2013.01); *H04B 7/0413* (2013.01); *H04B 7/0626* (2013.01);
(Continued)

(58) Field of Classification Search
None
See application file for complete search history.

(56) References Cited

U.S. PATENT DOCUMENTS

2012/0184281 A1* 7/2012 Kim .................. H04W 8/24
455/450
2015/0230206 A1* 8/2015 Tabet ................ H04W 72/02
370/329
(Continued)

FOREIGN PATENT DOCUMENTS

CN 102469611 A 5/2012
CN 103329458 A 9/2013
(Continued)

OTHER PUBLICATIONS

Huawei, Hisilicon, "Reduction capability size for SA NR", 3GPP TSG-RAN WG2 NR Ad Hoc R2-1707424, Jun. 27-29, 2017, 4 pages.
(Continued)

*Primary Examiner* — Ajit Patel
(74) *Attorney, Agent, or Firm* — Slater Matsil, LLP

(57) ABSTRACT

A method includes: determining, by a terminal device, a carrier aggregation capability and baseband capabilities of the terminal device, where the carrier aggregation capability includes a quantity of carriers and a bandwidth of a carrier in a carrier aggregation combination supported by the terminal device, and the baseband capabilities include a multiple-input multiple-output (MIMO) capability; sending, by the terminal device, the information of the carrier aggregation capability and the baseband capabilities to a network device; and receiving, by the terminal device, configuration information.

6 Claims, 7 Drawing Sheets

(51) Int. Cl.
| | |
|---|---|
| *H04W 72/04* | (2009.01) |
| *H04B 7/0413* | (2017.01) |
| *H04B 7/06* | (2006.01) |
| *H04W 8/24* | (2009.01) |
| *H04W 72/08* | (2009.01) |
| *H04W 88/02* | (2009.01) |

(52) U.S. Cl.
CPC ......... *H04W 8/24* (2013.01); *H04W 72/0453* (2013.01); *H04W 72/087* (2013.01); *H04W 88/02* (2013.01)

(56) References Cited

U.S. PATENT DOCUMENTS

| | | | |
|---|---|---|---|
| 2016/0374069 A1 | 12/2016 | Palm et al. | |
| 2017/0272221 A1* | 9/2017 | Yi | H04J 11/005 |
| 2018/0219652 A1* | 8/2018 | Chen | H04B 7/0626 |

FOREIGN PATENT DOCUMENTS

| | | |
|---|---|---|
| CN | 103716818 A | 4/2014 |
| WO | 2017013113 A1 | 1/2017 |
| WO | 2017027057 A1 | 2/2017 |

OTHER PUBLICATIONS

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 14)", Sep. 2017, 753 pages, V14.4.0.
3GPP TS 38.213 V1.0.0 (Sep. 2017), 3rd Generation Partnership Project; Technical Specification Group Radio Access Network; NR; Physical layer procedures for control(Release 15), 16 pages.
3GPP TS 38.300 V1.0.0 (Sep. 2017), 3rd Generation Partnership Project; Technical Specification Group Radio Access Network; NR; NR and NG-RAN Overall Description; Stage 2(Release 15), 59 pages.
3GPP TS 38.321 V1.0.0 (Sep. 2017), 3rd Generation Partnership Project; Technical Specification Group Radio Access Network; NR; Medium Access Control (MAC) protocol specification(Release 15), 46 pages.
3GPP TS 38.413 V0.3.0 (Aug. 2017), 3rd Generation Partnership Project; Technical Specification Group Radio Access Network; NG Radio Access Network (NG-RAN); NG Application Protocol (NGAP)(Release 15), 85 pages.
3GPP TS 38.423 V0.3.0 (Aug. 2017), 3rd Generation Partnership Project; Technical Specification Group Radio Access Network; NG Radio Access Network (NG-RAN); Xn application protocol (XnAP)(Release 15), 62 pages.
Intel Corporation, On TM10 / FD-MIMO UE capability signalling. 3GPP TSG-RAN WG4 Meeting #83, May 15-19, 2017, R4-1704647, 4 pages, Hangzhou, China.
Intel Corporation, Enhancements of TM-10 and FD-MIMO UE capability signaling . 3GPP TSG-RAN WG2 Meeting #96, R2-167760, Nov. 14-18, 2016, 5 pages, Reno, USA.
Intel Corporation, Report of email discussion: [96#35][LTE/FD-MIMO] UE capability signalling. 3GPP TSG-RAN WG2 Meeting #97, R2-1701311, Feb. 13-17, 2017, 5 pages, Athens, Greece.
3GPP TS 36.101; 3rd Generation Partnership Project; Technical Specification Group Radio Access Network; Evolved Universal Terrestrial Radio Access (E-UTRA); User Equipment (UE) radio transmission and reception (Release 14), (Jun. 2017), 29 pages, V14.4.0.
Intel Corporation, "UE capability signaling reduction", 3GPP TSG RAN WG2 Meeting Adhoc, R2-1707021, Jun. 27-29, 2017, 5 pages, Qingdao, China.
3GPP TS 38.306 V0.0.3 (Aug. 2017), 3rd Generation Partnership Project; Technical Specification Group Radio Access Network; NR; User Equipment (UE) radio access capabilities(Release 15), 8 pages.
3GPP TS 38.331 V0.0.5 (Aug. 2017), 3rd Generation Partnership Project; Technical Specification Group Radio Access Network; NR; Radio Resource Control (RRC); Protocol specification(Release 15), 38 pages.

* cited by examiner

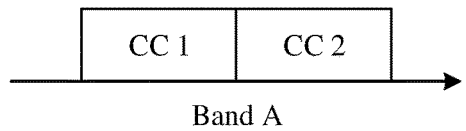
FIG. 3
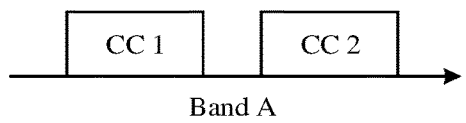
FIG. 4
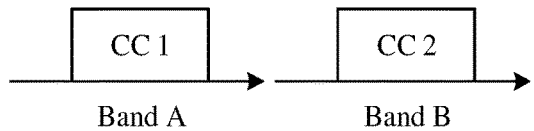
FIG. 5
| Sequence number | CSI capability | | MIMO capability | | Total bandwidth of the carrier aggregation combination |
|---|---|---|---|---|---|
| | Capability of a carrier aggregation combination | Carrier capability | Capability of the carrier aggregation combination | Carrier capability | |
| 1 | 12 | 4 | 20 | 8 | 160 M |
| 2 | 10 | 4 | 24 | 8 | 160 M |
| 3 | 12 | 4 | 32 | 8 | 80 M |
| ... | ... | ... | ... | ... | ... |
FIG. 6

| Sequence number | Quantity of carriers | Bandwidth of a carrier | MIMO capability of the carrier | CSI capability of the carrier |
|---|---|---|---|---|
| 1 | 1 | 10 M | 2 | 10 |
| 2 | 2 | 10 M + 10 M | 4+4 | 10+12 |
| | | 10 M + 20 M | | |
| | | 20 M + 20 M | | |
| ... | ... | ... | ... | ... |

FIG. 7

| Carrier aggregation band combination | Total antenna capability of the carrier aggregation band combination | Antenna capability of a carrier |
|---|---|---|
| 1 | 10 | Band 1<4>, band 2<4>, band 3<4>, band 42<8>, and band 43<8> |
| 2 | 16 | Band x<8> and band y<16> |
| ... | ... | ... |

FIG. 8

| Carrier aggregation band combination | Total antenna capability of the carrier aggregation band combination | Antenna capability of a carrier |
|---|---|---|
| 1 | 14 | Band 1<4>, band 2<4>, band 3<4>, band 42<8>, and band 43<8> |
| 2 | 16 | Band x<8> and band y<16> |
| ... | ... | ... |

INFORMATION TRANSMISSION METHOD, TERMINAL DEVICE, AND NETWORK DEVICE

CROSS-REFERENCE TO RELATED APPLICATIONS

This application is a continuation of International Application No. PCT/CN2018/105098, filed on Sep. 11, 2018, which claims priority to Chinese Patent Application No. 201710898879.X, filed on Sep. 28, 2017. The disclosures of the aforementioned applications are hereby incorporated by reference in their entireties.

TECHNICAL FIELD

This application relates to the communications field, and more specifically, to an information transmission method, a terminal device, and a network device in the communications field.

BACKGROUND

Carrier aggregation (CA) means that a plurality of contiguous or noncontiguous component carriers (CCs) are aggregated to obtain a larger bandwidth, to meet a higher transmission rate requirement of a mobile terminal user.

In the prior art, a terminal device may report a carrier aggregation capability of the terminal device based on a capability reporting request of a network device. The carrier aggregation capability includes a quantity of carriers and a bandwidth of a carrier in a carrier aggregation combination supported by the terminal device, a multiple-input multiple-output (MIMO) layer quantity and a channel state information (CSI) antenna quantity that are supported by the terminal device on each carrier in the carrier aggregation combination, and the like. The network device configures, for the terminal device based on the carrier aggregation capability reported by the terminal device, a MIMO layer quantity and a CSI antenna quantity that are used when the terminal device works on each carrier in the carrier aggregation combination.

The terminal device supports a large quantity of carrier aggregation combinations. Therefore, signaling overheads are relatively high by using an existing capability reporting method.

SUMMARY

This application provides an information transmission method, a terminal device, and a network device, to reduce signaling overheads.

According to a first aspect, this application provides an information transmission method. The method includes: determining, by a terminal device, a carrier aggregation capability and baseband capabilities of the terminal device, where the carrier aggregation capability includes a quantity of carriers and a bandwidth of a carrier in a carrier aggregation combination supported by the terminal device, the baseband capabilities include at least one of a multiple-input multiple-output (MIMO) capability and a channel state information (CSI) capability, the MIMO capability is used to indicate a quantity of MIMO layers that can be processed by the terminal device, and the CSI capability is used to indicate a quantity of CSI processes that can be processed by the terminal device; sending, by the terminal device, the carrier aggregation capability and the baseband capabilities to a network device; and receiving, by the terminal device, configuration information sent by the network device based on the carrier aggregation capability and the baseband capabilities, where the configuration information is used to configure a target baseband capability used by the terminal device when the terminal device works on each carrier in the carrier aggregation combination.

It should be understood that the target baseband capability in this embodiment of this application may be at least one of a MIMO layer quantity and a CSI process quantity on each carrier that are configured by the network device for the terminal device.

According to the information transmission method provided in this embodiment of this application, the terminal device decouples the baseband capabilities of the terminal device from the carrier aggregation capability, and reports the baseband capabilities to the network device as information of a terminal device level, so that the network device can determine the target baseband capability of the terminal device based on the carrier aggregation capability and the baseband capabilities of the terminal device.

In other words, the terminal device does not need to add a baseband capability on each carrier in each carrier aggregation combination to the carrier, so that signaling overheads can be reduced.

In a possible implementation, the method further includes: determining, by the terminal device, an antenna capability of the terminal device, where the antenna capability is used to indicate at least one of an antenna quantity supported by the terminal device in each of at least one band and a total antenna quantity supported by the terminal device in each of at least one band combination.

The sending, by the terminal device, the carrier aggregation capability and the baseband capabilities to a network device includes: sending, by the terminal device, the carrier aggregation capability, the baseband capabilities, and the antenna capability to the network device.

The receiving, by the terminal device, configuration information sent by the network device based on the carrier aggregation capability and the baseband capabilities includes: receiving, by the terminal device, the configuration information sent by the network device based on the carrier aggregation capability, the baseband capabilities, and the antenna capability.

A MIMO capability supported by the terminal device on a carrier is not only limited to the baseband capabilities of the terminal device, but also limited to the antenna capability of the terminal device in. Therefore, if only the carrier aggregation capability and the baseband capabilities are reported, a MIMO capability indicated in the configuration information sent by the network device to the terminal device may exceed the antenna capability of the terminal device. In this case, reporting may need to be performed again.

In this embodiment of this application, the terminal device reports the carrier aggregation capability, the baseband capabilities, and the antenna capability to the network device together, so that the network device can determine the target baseband capability of the terminal device based on the carrier aggregation capability, the baseband capabilities, and the antenna capability, and signaling overheads are reduced.

In a possible implementation, the baseband capabilities include the MIMO capability, and the method further includes: determining, by the terminal device, whether a MIMO capability supported by the terminal device on each carrier in the carrier aggregation combination can reach the MIMO capability indicated by the baseband capabilities.

The sending, by the terminal device, the carrier aggregation capability and the baseband capabilities to a network device includes: sending the carrier aggregation capability and the baseband capabilities to the network device when the terminal device determines that the MIMO capability supported by the terminal device on the carrier in the carrier aggregation combination can reach the MIMO capability indicated by the baseband capabilities, where the carrier aggregation capability does not include the MIMO capability supported by the terminal device on any carrier in the carrier aggregation combination; or sending the carrier aggregation capability and the baseband capabilities to the network device when the terminal device determines that a MIMO capability supported by the terminal device on a first carrier in the carrier aggregation combination cannot reach the MIMO capability indicated by the baseband capabilities, where the carrier aggregation capability further includes the MIMO capability supported by the terminal device on the first carrier.

In other words, if the carrier aggregation capability reported by the terminal device does not carry the MIMO capability on any carrier in the carrier aggregation combination, it indicates that the MIMO capability supported by the terminal device on the carrier in the carrier aggregation combination can meet the MIMO capability indicated by the baseband capabilities, and the network device may directly determine, based on the reported baseband capabilities, the target baseband capability used by the terminal device.

If the carrier aggregation capability reported by the terminal device carries the MIMO capability on the first carrier included in the carrier aggregation combination, it indicates that the MIMO capability supported by the terminal device on the first carrier cannot meet the MIMO capability indicated by the baseband capabilities, and in this case, the network device directly determines the carried MIMO capability supported on the first carrier as a target baseband capability on the first carrier, to reduce computational complexity of the network device.

In a possible implementation, before the determining, by a terminal device, a carrier aggregation capability and baseband capabilities of the terminal device, the method further includes: receiving, by the terminal device, a request message sent by the network device, where the request message carries second information, and the second information is used by the terminal device to determine a baseband capability range to be reported.

The determining, by a terminal device, a carrier aggregation capability and baseband capabilities of the terminal device includes: determining, by the terminal device, the baseband capabilities based on the second information, where the baseband capabilities meet the baseband capability range determined by the terminal device based on the second information.

In a possible implementation, the second information includes a carrier aggregation combination range that the terminal device is requested to report, and the carrier aggregation combination range includes at least one of a requested maximum MIMO layer quantity, a requested maximum CSI process quantity, a requested band in which the carrier in the carrier aggregation combination is located, a requested maximum bandwidth of carriers in the carrier aggregation combination, and a requested maximum quantity of the carriers in the carrier aggregation combination.

The determining, by the terminal device, the baseband capabilities based on the second information includes: determining, by the terminal device, the carrier aggregation capability based on the carrier aggregation combination range, where the carrier aggregation capability meets the carrier aggregation combination range; determining the baseband capability range based on the carrier aggregation capability; and determining the baseband capabilities based on the baseband capability range, where the baseband capabilities meet the baseband capability range.

In a possible implementation, the second information includes a baseband capability range that the terminal device is requested to report, and the baseband capability range includes at least one of a requested maximum MIMO layer quantity, a requested maximum MIMO layer quantity that is supported on the carrier, a requested maximum CSI process quantity, a requested maximum bandwidth of the carrier aggregation combination, a requested maximum CSI process quantity that is supported on the carrier, a requested maximum bandwidth of carriers in the carrier aggregation combination, and a requested maximum quantity of the carriers in the carrier aggregation combination.

After the terminal device reports the carrier aggregation capability, the baseband capabilities, and the antenna capability to the network device, in addition to the carrier aggregation capability, the baseband capabilities, and the antenna capability of the terminal device, the network device further needs to consider a resource condition of the network device, for example, baseband capabilities and a frequency domain resource that are supported by the network device.

The network device adds, to the request message, information used to indicate at least one of the baseband capability range, the carrier aggregation combination range, and an antenna capability range, so that a reporting range of the terminal device can be reduced, and signaling overheads can be reduced.

In a possible implementation, the sending, by the terminal device, the carrier aggregation capability and the baseband capabilities to a network device includes: sending, by the terminal device, the carrier aggregation capability, the baseband capabilities, and the second information to the network device.

After obtaining capability information (including the reported carrier aggregation capability and baseband capabilities) of the terminal device, the network device stores the capability information and forwards the capability information to another network device. Therefore, adding the second information to the capability information can enable the another network device to learn that the baseband capabilities are reported based on the second information, so that the another network device determines whether a capability of the terminal device needs to be re-requested.

In a possible implementation, the baseband capabilities include a baseband capability of the terminal device on a carrier aggregation combination corresponding to each of at least one total bandwidth and a baseband capability of the terminal device on each carrier in the carrier aggregation combination corresponding to the total bandwidth, and the total bandwidth is a sum of bandwidths of all carriers in a carrier aggregation combination including at least one carrier.

In a possible implementation, information about the baseband capabilities includes a baseband capability of the terminal device with regard to each of at least one class of carrier information, and the carrier information includes a quantity of carriers and a bandwidth of a carrier.

According to a second aspect, this application provides an information transmission method. The method includes: receiving, by a network device, a carrier aggregation capability and baseband capabilities of a terminal device that are sent by the terminal device, where the carrier aggregation capability includes a quantity of carriers and a bandwidth of a carrier in a carrier aggregation combination supported by the terminal device, the baseband capabilities include at least one of a multiple-input multiple-output (MIMO) capability and a channel state information (CSI) capability, the MIMO capability is used to indicate a quantity of MIMO layers that can be processed by the terminal device, and the CSI capability is used to indicate a quantity of CSI processes that can be processed by the terminal device; determining, by the network device, configuration information of the terminal device based on the carrier aggregation capability and the baseband capabilities, where the configuration information is used to configure a target baseband capability used by the terminal device when the terminal device works on each carrier in the carrier aggregation combination; and sending, by the network device, the configuration information to the terminal device.

It should be understood that the target baseband capability in this embodiment of this application may be at least one of a MIMO layer quantity and a CSI process quantity on each carrier that are configured by the network device for the terminal device.

In a possible implementation, the method further includes: receiving, by the network device, an antenna capability sent by the terminal device, where the antenna capability is used to indicate at least one of an antenna quantity supported by the terminal device in each of at least one band and a total antenna quantity supported by the terminal device in each of at least one band combination.

The determining, by the network device, configuration information of the terminal device based on the carrier aggregation capability and the baseband capabilities includes: determining, by the network device, the configuration information of the terminal device based on the carrier aggregation capability, the baseband capabilities, and the antenna capability.

In a possible implementation, before the receiving, by a network device, a carrier aggregation capability and baseband capabilities of a terminal device that are sent by the terminal device, the method further includes: sending, by the network device, a request message to the terminal device, where the request message carries second information, and the second information is used by the terminal device to determine a baseband capability range to be reported.

The receiving, by a network device, a carrier aggregation capability and baseband capabilities of a terminal device that are sent by the terminal device includes: receiving, by the network device, the carrier aggregation capability and the baseband capabilities of the terminal device that are sent by the terminal device based on the second information.

In a possible implementation, the second information includes a carrier aggregation combination range that the terminal device is requested to report, and the carrier aggregation combination range includes at least one of a requested maximum MIMO layer quantity, a requested maximum CSI process quantity, a requested band in which the carrier in the carrier aggregation combination is located, a requested maximum bandwidth of carriers in the carrier aggregation combination, and a requested maximum quantity of the carriers in the carrier aggregation combination.

In a possible implementation, the second information includes a baseband capability range that the terminal device is requested to report, and the baseband capability range includes at least one of a requested maximum MIMO layer quantity, a requested maximum MIMO layer quantity that is supported on the carrier, a requested maximum CSI process quantity, a requested maximum CSI process quantity that is supported on the carrier, a requested maximum bandwidth of the carrier aggregation combination, a requested maximum bandwidth of carriers in the carrier aggregation combination, and a requested maximum quantity of the carriers in the carrier aggregation combination.

In a possible implementation, the baseband capabilities include a baseband capability of the terminal device on a carrier aggregation combination corresponding to each of at least one total bandwidth and a baseband capability of the terminal device on each carrier in the carrier aggregation combination corresponding to the total bandwidth, and the total bandwidth is a sum of bandwidths of all carriers in a carrier aggregation combination including at least one carrier.

In a possible implementation, information about the baseband capabilities includes a baseband capability of the terminal device with regard to each of at least one class of carrier information, and the carrier information includes a quantity of carriers and a bandwidth of a carrier.

According to a third aspect, this application provides a terminal device, configured to perform the method according to any one of the first aspect or the possible implementations of the first aspect.

According to a fourth aspect, this application provides a network device, configured to perform the method according to any one of the second aspect or the possible implementations of the second aspect.

According to a fifth aspect, this application provides a terminal device. The terminal device includes a memory, a processor, a transceiver, and a computer program stored in the memory and capable of being run on the processor. When executing the computer program, the processor performs the method according to any one of the first aspect or the possible implementations of the first aspect.

According to a sixth aspect, this application provides a network device. The network device includes a memory, a processor, a transceiver, and a computer program stored in the memory and capable of being run on the processor. When executing the computer program, the processor performs the method according to any one of the second aspect or the possible implementations of the second aspect.

According to a seventh aspect, this application provides a computer-readable medium, configured to store a computer program. The computer program includes an instruction used to perform the method according to any one of the first aspect or the possible implementations of the first aspect.

According to an eighth aspect, this application provides a computer-readable medium, configured to store a computer program. The computer program includes an instruction used to perform the method according to any one of the second aspect or the possible implementations of the second aspect.

According to a ninth aspect, this application provides a computer program product including an instruction. When the computer program product is run on a computer, the computer is enabled to perform the method according to any one of the first aspect or the possible implementations of the first aspect.

According to a tenth aspect, this application provides a computer program product including an instruction. When the computer program product is run on a computer, the computer is enabled to perform the method according to any one of the second aspect or the possible implementations of the second aspect.

According to an eleventh aspect, this application provides a chip, including: an input interface, an output interface, at least one processor, and a memory. The input interface, the output interface, the processor, and the memory communicate with each other by using an internal connection path. The processor is configured to execute code in the memory. When the code is executed, the processor is configured to perform the method according to any one of the first aspect or the possible implementations of the first aspect.

According to a twelfth aspect, this application provides a chip, including: an input interface, an output interface, at least one processor, and a memory. The input interface, the output interface, the processor, and the memory communicate with each other by using an internal connection path. The processor is configured to execute code in the memory. When the code is executed, the processor is configured to perform the method according to any one of the second aspect or the possible implementations of the second aspect.

BRIEF DESCRIPTION OF THE DRAWINGS

FIG. 3 is a schematic diagram of intra-band contiguous carrier aggregation;

FIG. 4 is a schematic diagram of intra-band noncontiguous carrier aggregation;

FIG. 5 is a schematic diagram of inter-band noncontiguous carrier aggregation;

FIG. 6 is a schematic diagram of baseband capabilities according to an embodiment of this application;

FIG. 7 is another schematic diagram of baseband capabilities according to an embodiment of this application;

FIG. 8 is a schematic diagram of an antenna capability according to an embodiment of this application;

DETAILED DESCRIPTION OF ILLUSTRATIVE EMBODIMENTS

The following describes technical solutions of this application with reference to accompanying drawings.

It should be understood that, the technical solutions of embodiments of this application may be applied to various communications systems, such as a global system for mobile communications (GSM) system, a code division multiple access (CDMA) system, a wideband code division multiple access (WCDMA) system, a general packet radio service (GPRS), an LTE system, an LTE frequency division duplex (FDD) system, an LTE time division duplex (TDD), a universal mobile telecommunications system (UMTS), a worldwide interoperability for microwave access (WiMAX) communications system, a wireless local area network (WLAN), a future fifth generation ( ) system, or a new radio (NR).

Figure 1:
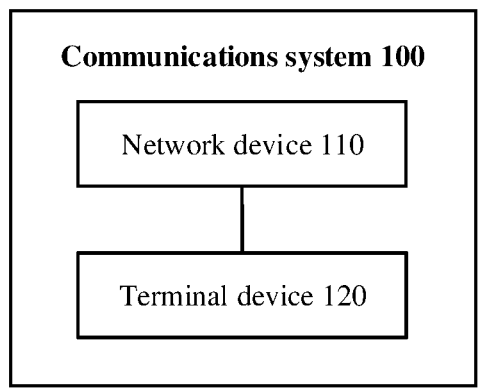
FIG. 1 is a schematic architectural diagram of a communications system according to an embodiment of this application.

FIG. 1 is a schematic architectural diagram of a communications system 100 according to an embodiment of this application. As shown in FIG. 1, the communications system 100 may include at least one network device (a network device 110 is shown in FIG. 1) and at least one terminal device (a terminal device 120 is shown in FIG. 1). Wireless communication may be performed between the at least one network device and the at least one terminal device.

FIG. 1 shows an example of one network device and one terminal device. Optionally, the communications system 100 may alternatively include a plurality of network devices, and another quantity of terminal devices may be included within coverage of each network device. This is not limited in this embodiment of this application. Optionally, the communications system 100 may further include another network entity such as a network controller or a mobility management entity. This embodiment of this application is not limited thereto.

Optionally, the network device can provide communication coverage for a specific geographical area and can communicate with UE within the coverage area. The network device may be a base transceiver station (BTS) in a GSM system or a CDMA system, or may be a NodeB (nodeB, NB) in a WCDMA system, an evolved NodeB (evolved node B, eNB or eNodeB) in a long term evolution (LTE) system, or a radio controller in a cloud radio access network (CRAN). The network device may alternatively be a core network device, a relay station, an access point, a vehicle-mounted device, a wearable device, a network side device in a future 5G or NR network, a network device in a future evolved public land mobile network (PLMN), or the like.

Optionally, the terminal device may be mobile or fixed. The terminal device may be an access terminal, user equipment (UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant (personal digital assistant, PDA), a handheld device having a wireless communication function, a computing device, another processing device connected to a wireless modem, a vehicle-mounted device, a wearable device, a terminal device in the future 5G or NR network, a terminal device in the future evolved PLMN, or the like.

Figure 2:
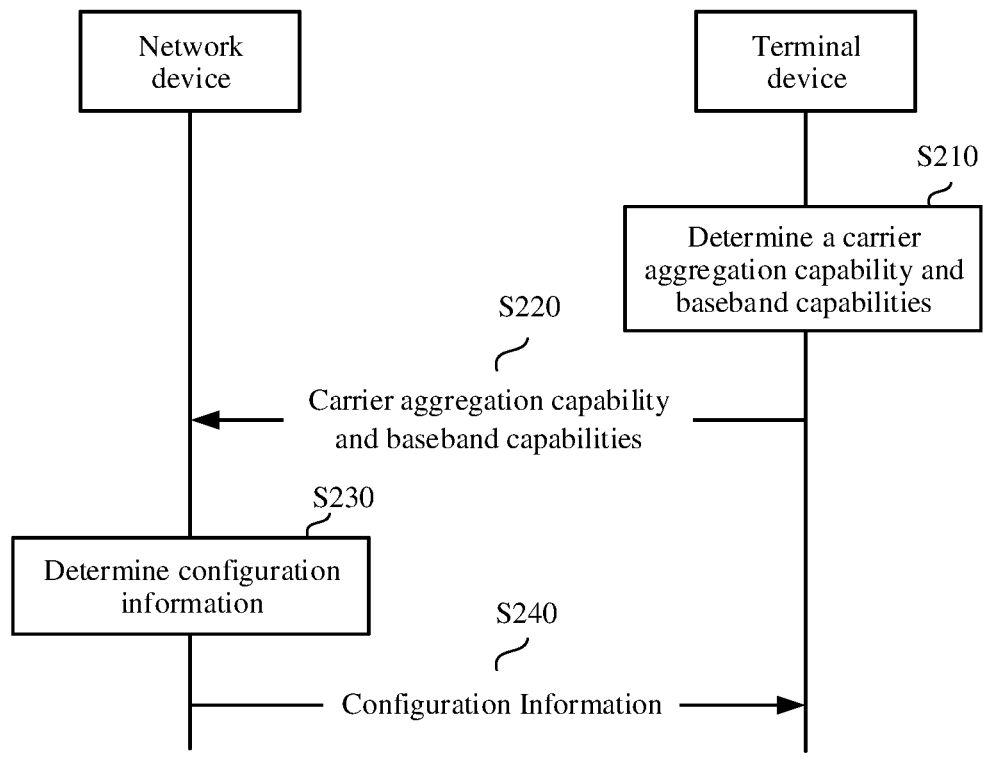
FIG. 2 is a schematic flowchart of an information transmission method according to an embodiment of this application.

FIG. 2 is a schematic flowchart of an information transmission method 200 according to an embodiment of this application. The method 200 may be applied to the communications system shown in FIG. 1. This is not limited in the embodiments of this application.

S210: A terminal device determines a carrier aggregation capability and baseband capabilities of the terminal device, where the carrier aggregation capability includes a quantity of carriers and a bandwidth of a carrier in a carrier aggregation combination supported by the terminal device, the baseband capabilities include at least one of a multiple-input multiple-output (MIMO) capability and a channel state information (CSI) capability, the MIMO capability is used to indicate a quantity of MIMO layers that can be processed by the terminal device, and the CSI capability is used to indicate a quantity of CSI processes that can be processed by the terminal device.

S220: The terminal device sends the carrier aggregation capability and the baseband capabilities to a network device, and correspondingly, the network device receives the carrier aggregation capability and the baseband capabilities that are sent by the terminal device.

S230: The network device determines configuration information of the terminal device based on the carrier aggregation capability and the baseband capabilities, where the configuration information is used to configure a target baseband capability used by the terminal device when the terminal device works on each carrier in the carrier aggregation combination.

S240: The network device sends the configuration information to the terminal device, and correspondingly, the terminal device receives the configuration information sent by the network device.

It should be understood that the carrier aggregation combination in this embodiment of this application may also be referred to as a carrier aggregation band combination. This is not limited in the embodiments of this application.

It should be further understood that the carrier aggregation band combination in this embodiment of this application may include at least one band, and each band may include one or more carriers.

Optionally, carrier aggregation may be classified into contiguous carrier aggregation and noncontiguous carrier aggregation based on a frequency adjacent relationship between carriers participating in aggregation. The noncontiguous carrier aggregation is further classified into intra-band noncontiguous carrier aggregation and inter-band noncontiguous carrier aggregation.

Optionally, carrier aggregation may be classified into inter-band (inter-band) aggregation and intra-band (intra-band) aggregation based on the carrier aggregation capability of the terminal device. The inter-band aggregation is noncontiguous carrier aggregation, and the intra-band aggregation may be contiguous carrier aggregation, or may be noncontiguous carrier aggregation.

For example, FIG. 3 is a schematic diagram of intra-band contiguous carrier aggregation, and as shown in FIG. 3, CC 1 and CC 2 in Band A are contiguous. FIG. 4 is a schematic diagram of intra-band noncontiguous carrier aggregation, and in FIG. 4, CC 1 and CC 2 in Band A are noncontiguous. FIG. 5 is a schematic diagram of inter-band noncontiguous carrier aggregation, and as shown in FIG. 5, Band A includes CC 1, and Band B includes CC 2.

It should be further understood that the baseband capabilities in this embodiment of this application may include the multiple-input multiple-output (MIMO) capability and the channel state information (CSI) capability. The MIMO capability indicates the quantity of MIMO layers that can be processed by the terminal device, and the CSI capability indicates the quantity of CSI processes that can be processed by the terminal device.

It should be further understood that the target baseband capability in this embodiment of this application may be at least one of a MIMO layer quantity and a CSI process quantity on each carrier that are configured by the network device for the terminal device.

It should be further understood that the capability in this embodiment of this application may be understood as a maximum value that can be reached. For example, the MIMO capability of the terminal device may be understood as a maximum quantity of MIMO layers that can be processed.

It should be further understood that the carrier aggregation capability of the terminal device is used to indicate that the terminal device supports one or more carrier aggregation combinations. And the one or more carrier aggregation combinations include the carrier aggregation combination. This is not limited in the embodiments of this application.

Optionally, in S210, the carrier aggregation capability may include the quantity of the carriers and the bandwidth of the carrier in the carrier aggregation combination supported by the terminal device.

For example, it is assumed that the carrier aggregation capability of the terminal device indicates that the terminal device supports a carrier aggregation combination including four carriers, where a bandwidth of each carrier is 20 M. It may be obtained, based on the carrier aggregation capability, that carrier aggregation combinations supported by the terminal device may include:

(1) a carrier aggregation combination 1: Band 1 [2*20 M]+Band 2 [2*20 M], which includes four carriers, where a bandwidth of each carrier is 20 M, and Band 1 [2*20 M] indicates that a band 1 includes two carriers whose bandwidths are 20 M, and Band 2 [2*20 M] indicates that a band 2 includes two carriers whose bandwidths are 20 M;

(2) a carrier aggregation combination 2: Band 1 [1*20 M]+Band 2 [2*20 M], which includes three carriers, where a bandwidth of each carrier is 20 M;

(3) a carrier aggregation combination 3: Band 1 [1*20 M]+Band 2 [1*20 M], which includes two carriers, where a bandwidth of each carrier is 20 M;

(4) a carrier aggregation combination 4: Band 1 [2*20 M]+Band 2 [2*10 M], which includes four carriers, where bandwidths of two carriers are 20 M, and bandwidths of two carriers are 10 M; and (5) a carrier aggregation combination 5: Band 1 [1*10 M]+Band 2 [1*10 M], which includes two carriers, where a bandwidth of each carrier is 20 M.

It should be understood that the five carrier aggregation combinations each are a carrier combination that can be used by the terminal device in a case of the carrier aggregation capability.

Optionally, the terminal device may further include other carrier combinations in the case of the carrier aggregation capability. The foregoing merely uses the carrier aggregation combinations (1) to (5) as an example for description. The terminal device may further support other carrier aggregation combinations in the case of the carrier aggregation capability. This is not limited in the embodiments of this application.

Optionally, in 210, the baseband capabilities are used to indicate at least one of the MIMO capability and the CSI capability that are supported by the terminal device.

In an optional embodiment, the baseband capabilities may include a baseband capability of the terminal device on a carrier aggregation combination corresponding to each of at least one total bandwidth and a baseband capability of the terminal device on each carrier in the carrier aggregation combination corresponding to the total bandwidth, and the total bandwidth is a sum of bandwidths of all carriers in a carrier aggregation combination including at least one carrier.

For example, FIG. 6 is a schematic diagram of reported baseband capabilities according to an embodiment of this application. As shown in FIG. 6, assuming that a carrier aggregation combination supported by the terminal device includes Band 1 [2*20 M]+Band 2 [2*20 M]+Band 3 [2*40 M], a total bandwidth of the carrier aggregation combination is 2*20+2*20+2*40=160 M. It may be learned from FIG. 6 that a MIMO capability of the terminal device on each carrier in the carrier aggregation combination is eight layers of MIMO, a CSI capability of the terminal device on the carrier in the carrier aggregation combination is four processes, a MIMO capability of the terminal device on the carrier aggregation combination is 20 layers of MIMO or 24 layers of MIMO, and a CSI capability of the terminal device on the carrier aggregation combination is 12 processes or 10 processes.

In another optional embodiment, information about the baseband capabilities includes a baseband capability of the terminal device with regard to each of at least one class of carrier information, and the carrier information includes a quantity of carriers and a bandwidth of a carrier. The carrier information may be referred to as a bandwidth class. The baseband capabilities may be a baseband capability for each carrier in the carrier information, or a total baseband capability on the carrier information. Specifically, for example, the carrier information is that there are two carriers and each carrier is 20 M, and a baseband capability corresponding to the carrier information may include a maximum MIMO layer quantity and/or a maximum CSI process quantity on each carrier, or a maximum MIMO layer quantity and/or a maximum CSI process quantity of all carriers.

In addition, the baseband capabilities may also include a combination of baseband capabilities corresponding to different carrier information, for example, a combination of a baseband capability with regard to carrier information indicating that there are two carriers and each carrier is 20 M and a baseband capability with regard to carrier information indicating that there are three carriers and each carrier is 40 M.

It should be understood that FIG. 6 shows only an example of the baseband capabilities of the terminal device. The baseband capabilities of the terminal device may further include a baseband capability corresponding to another total bandwidth. This is not limited in the embodiments of this application.

FIG. 7 is another schematic diagram of reported baseband capabilities according to an embodiment of this application. As shown in FIG. 7, it is assumed that a carrier aggregation combination supported by the terminal device includes Band 1 [1*10 M]+Band 2 [1*10 M]. It may be learned from FIG. 7 that a MIMO capability of the terminal device on each carrier in the carrier aggregation combination is four layers of MIMO, and a CSI capability of the terminal device on each carrier in the carrier aggregation combination is 10 processes.

It should be understood that FIG. 7 shows only an example of the baseband capabilities of the terminal device. The baseband capabilities of the terminal device may further include baseband capabilities corresponding to other carrier information. This is not limited in the embodiments of this application.

It should be understood that FIG. 6 and FIG. 7 are merely two possible implementations of reporting the baseband capabilities. The terminal device may alternatively use other baseband capability reporting manners. This is not limited in the embodiments of this application.

Optionally, in S230, that the network device determines the configuration information of the terminal device based on the carrier aggregation capability and the baseband capabilities may be that the network device determines, based on a frequency domain resource condition of the network device and the carrier aggregation capability of the terminal device, carrier aggregation combinations that can be used by the terminal device, and then determines the configuration information of the terminal device based on the carrier aggregation combinations and the baseband capabilities of the terminal device.

For example, the carrier aggregation capability reported by the terminal device includes the carrier aggregation combinations (1) to (5). The network device determines, based on a frequency resource of the network device, that the terminal device can use the carrier aggregation combination (3), the carrier aggregation combination (4), and the carrier aggregation combination (5), and determines the configuration information of the terminal device based on a total bandwidth of each carrier aggregation combination and the baseband capabilities shown in FIG. 6, or determines the configuration information of the terminal device based on a quantity of carriers and bandwidths of the carriers in each carrier aggregation combination and the baseband capabilities shown in FIG. 7.

For example, the network device may learn, based on that a carrier aggregation combination supported by the terminal device includes Band 1 [2*20 M]+Band 2 [2*20 M]+Band 3 [2*40 M], that a total bandwidth of the carrier aggregation combination is 160 M, and the baseband capabilities shown in FIG. 6, that eight layers of MIMO and four CSI processes are supported on each carrier in the carrier aggregation combination, and that 20 layers of MIMO or 24 layers of MIMO and 12 CSI processes or 10 CSI processes are supported on the carrier aggregation combination. In this case, the network device may configure a maximum of eight layers of MIMO and four CSI processes for Band 1, a maximum of eight layers of MIMO and four CSI processes for Band 2, and a maximum of eight layers of MIMO and four CSI processes for Band 3, that is, configure 8+8+8=24 layers of MIMO and 4+4+4=12 CSI processes in total for the carrier aggregation combination.

The baseband capabilities indicate that 10 CSI processes are supported when 24 layers of MIMO are supported on the carrier aggregation combination. Therefore, two CSI processes are configured only for one band selected from Band 1, Band 2, or Band 3, and four CSI processes are configured for remaining bands. Alternatively, the baseband capabilities indicate that 20 layers of MIMO are supported when 12 CSI processes are supported on the carrier aggregation combination. Therefore, one band is selected from Band 1, Band 2, and Band 3 and MIMO configured for the band is reduced by four layers. Alternatively, two bands are selected and MIMO configured for the bands is separately reduced by two layers separately.

According to the information transmission method provided in this embodiment of this application, the terminal device decouples the baseband capabilities from the carrier aggregation capability. To be specific, the baseband capabilities are unrelated to the carrier aggregation capability. Therefore, the terminal device no longer reports the baseband capabilities to the network device together with the carrier aggregation capability, but separately reports the baseband capabilities to the network device as information of a terminal device level, so that the network device determines the configuration information of the terminal device based on the carrier aggregation capability and the baseband capabilities, and signaling overheads in a carrier aggregation capability reporting process can be reduced.

Optionally, when the baseband capabilities include the MIMO capability, the terminal device may determine whether a MIMO capability supported by the terminal device on each carrier in the carrier aggregation combination can reach the MIMO capability indicated by the baseband capabilities. When the terminal device determines that the MIMO capability supported by the terminal device on the carrier in the carrier aggregation combination can reach the MIMO capability indicated by the baseband capabilities, the terminal device sends the carrier aggregation capability and the baseband capabilities to the network device, where the carrier aggregation capability does not include the MIMO capability supported by the terminal device on any carrier in the carrier aggregation combination.

Correspondingly, when the terminal device determines that a MIMO capability supported by the terminal device on a first carrier in the carrier aggregation combination cannot reach the MIMO capability indicated by the baseband capabilities, the terminal device sends the carrier aggregation capability and the baseband capabilities to the network device, where the carrier aggregation capability further includes the MIMO capability supported by the terminal device on the first carrier.

For example, it is assumed that the terminal device works in Band 1 [1*160 M], and Band 1 includes CC 1. The baseband capabilities shown in FIG. 6 indicates that the terminal device supports eight layers of MIMO on CC 1. However, in the band, the terminal device can process only two layers of MIMO. That is, a MIMO capability supported by the terminal device on the CC 1 cannot reach a MIMO capability indicated by the baseband capabilities. In this case, the terminal device may indicate the MIMO capability supported by the terminal device on the CC 1 in the carrier aggregation capability.

In other words, if the carrier aggregation capability reported by the terminal device does not carry the MIMO capability on any carrier in the carrier aggregation combination, it indicates that the MIMO capability supported by the terminal device on the carrier in the carrier aggregation combination can meet the MIMO capability indicated by the baseband capabilities; or if the carrier aggregation capability reported by the terminal device carries the MIMO capability on the first carrier included in the carrier aggregation combination, it indicates that the MIMO capability supported by the terminal device on the first carrier cannot meet the MIMO capability indicated by the baseband capabilities, and in this case, the network device needs to determine the configuration information based on the carried MIMO capability supported on the first carrier.

Optionally, when the terminal device determines that the MIMO capability supported on the first carrier cannot reach the MIMO capability indicated by the baseband capabilities, the terminal device may indicate MIMO capabilities on all carriers in the carrier aggregation combination or indicate only the MIMO capability on the first carrier in the carrier aggregation capability. This is not limited in the embodiments of this application.

It should be understood that because the CSI capability of the terminal device is related only to a CSI capability that can be processed by a baseband supported by the terminal device, the network device can determine the configuration information of the terminal device based only on the carrier aggregation capability and the baseband capabilities.

However, the MIMO capability of the terminal device is not only related to a MIMO capability that can be processed by the baseband supported by the terminal device, but also related to an antenna capability that can be processed by the terminal device. That is, the MIMO capability supported by the terminal device is limited by the baseband capabilities and the antenna capability.

For example, it is assumed that when the terminal device works in Band 1 [1*160 M], the baseband capabilities shown in FIG. 6 indicates that the terminal device supports eight layers of MIMO. However, in the band in which Band 1 is located, an antenna capability that the terminal device can process is only two antennas. Therefore, when the terminal device works in Band 1, a MIMO capability supported by the terminal device is two layers.

Therefore, when reporting the carrier aggregation capability and the bandwidth capability, the terminal device may further report the antenna capability of the terminal device.

Optionally, the method further includes: determining, by the terminal device, the antenna capability of the terminal device, where the antenna capability is used to indicate at least one of an antenna quantity supported by the terminal device in each of at least one band and a total antenna quantity supported by the terminal device in each of at least one band combination. In S220, that the terminal device sends the carrier aggregation capability and the baseband capabilities to the network device may be that the terminal device sends the carrier aggregation capability, the baseband capabilities, and the antenna capability to the network device. Correspondingly, the network device receives the carrier aggregation capability, the baseband capabilities, and the antenna capability that are sent by the terminal device.

FIG. 8 is a schematic diagram of a reported antenna capability according to an embodiment of this application. As shown in FIG. 8, Band 1<4> indicates that a band 1 supports four antennas, Band 2<4> indicates that a band 2 supports four antennas, Band 42<8> indicates that a band 42 supports eight antennas, and Band 43<8> indicates that a band 43 supports eight antennas. It should be understood that a band combination 1 includes Band 1, Band 2, Band 3, Band 42, and Band 43, and the bands are correlated. Therefore, for the band combination 1, there is also an upper antenna capability limit. To be specific, the terminal device supports a total of 10 antennas in the band combination 1.

Optionally, that the network device determines the configuration information based on the carrier aggregation capability and the baseband capabilities in S230 may be that the network device determines the configuration information based on the carrier aggregation capability, the baseband capabilities, and the antenna capability.

For example, it is assumed that the terminal device configures four antennas in Band 1. If Band 1 includes only one carrier, the terminal device supports four layers of MIMO on the carrier. If Band 1 includes two contiguous carriers, the terminal device supports 2*4=8 layers of MIMO in Band 1. If Band 1 includes two noncontiguous carriers, the terminal device shares the four antennas in Band 1. To be specific, the terminal device supports four layers of MIMO on one carrier in Band 1, or supports two layers of MIMO on each carrier.

Optionally, the carrier aggregation capability may further include information indicating whether the carriers in the carrier aggregation combination are contiguous. For noncontiguously aggregated carriers, the terminal device needs to repeatedly report a same band to indicate the noncontiguous carriers.

For example, Band 1 [1*20 M]+Band 1 [1*20 M] indicates two noncontiguous carriers of 20 M in the band 1. Band 1 [2*20 M] indicates two contiguous carriers in the band 1.

For example, it is assumed that a carrier aggregation combination supported by the terminal device includes Band 1 [2*20 M]+Band 2 [2*20 M], and two carriers in each band are contiguous. Band 1<4> and Band 2<4> can be learned from FIG. 8. To be specific, Band 1 supports 2*4=8 layers of MIMO, and Band 2 supports 2*4=8 layers of MIMO. It can be learned from FIG. 6 that four layers of MIMO may be configured for each carrier in Band 1, Band 2, and Band 3, and a total of eight layers of MIMO are configured for all carriers in each of Band 1, Band 2, and Band 3.

For another example, it is assumed that a carrier aggregation combination supported by the terminal device includes Band 1 [2*20 M]+Band 2 [2*20 M]+Band 3 [4*40 M], and two carriers in each band are contiguous. It can be learned from FIG. 8 that Band 1<4>, Band 2<4>, and Band 3<4> all belong to the band combination 1, and a total antenna capability supported in the band combination 1 is 10 antennas. Therefore, antennas configured for one of the bands may be reduced by two, for example, Band 1<2>, Band 2<4>, and Band 3<4>. Therefore, Band 1 supports 2*2=4 layers of MIMO, Band 2 supports 2*4=8 layers of MIMO, and Band 4 supports 2*4=8 layers of MIMO. It can be learned from FIG. 6 that two layers of MIMO may be configured for each carrier in Band 1, and a total of four layers of MIMO are configured for two carriers; and four layers of MIMO may be configured for each carrier in Band 2 or band 3, and a total of eight layers of MIMO are configured for each band.

It should be understood that after the terminal device reports the carrier aggregation capability, the baseband capabilities, and the antenna capability to the network device, in addition to the carrier aggregation capability, the baseband capabilities, and the antenna capability of the terminal device, the network device further needs to consider a resource condition of the network device, for example, baseband capabilities and a frequency domain resource that are supported by the network device.

Optionally, before S210, the method further includes: sending, by the network device, a request message to the terminal device, where the request message carries second information, and the second information is used by the terminal device to determine a baseband capability range to be reported; correspondingly, the terminal device receives the request message sent by the network device. In S210, that the terminal device determines the carrier aggregation capability and the baseband capabilities of the terminal device may be that the terminal device determines the baseband capabilities based on the second information, where the baseband capabilities meet the baseband capability range indicated by the second information. The request message is used to request the terminal device to report a capability of the terminal device.

Optionally, the second information may explicitly indicate the baseband capability range, or implicitly indicate the baseband capability range. This is not limited in the embodiments of this application.

In an optional embodiment, the second information may explicitly indicate the baseband capability range. To be specific, the second information includes a baseband capability range that the terminal device is requested to report, and the baseband capability range includes at least one of a requested maximum MIMO layer quantity, a requested maximum MIMO layer quantity that is supported on the carrier, a requested maximum CSI process quantity, a requested maximum CSI process quantity that is supported on the carrier, a requested maximum bandwidth of the carrier aggregation combination, a requested maximum bandwidth of carriers in the carrier aggregation combination, and a requested maximum quantity of the carriers in the carrier aggregation combination.

For example, the baseband capability range may be that the requested maximum MIMO layer quantity is two. The terminal device may report, to the network device, a baseband capability that indicates a MIMO layer quantity being two or less and that is in the baseband capabilities. For example, in FIG. 7, only a first combination of baseband capabilities are reported, and a second combination of baseband capabilities are not reported.

For another example, the baseband capability range may be that the requested maximum bandwidth of the carrier aggregation combination is 160 M. The terminal device may report, to the network device, a baseband capability that indicates a total bandwidth being 160 M or less and that is in the baseband capabilities. For example, in FIG. 6, only a baseband capability on a carrier aggregation combination corresponding to a total bandwidth of 160 M or less is reported.

For another example, the baseband capability range may include that the requested maximum bandwidth of the carrier aggregation combination is 160 M and that the requested maximum MIMO layer quantity that is supported on the carrier is 24. The terminal device may report, to the network device, a baseband capability that indicates a total bandwidth being 160 M or less and a supported MIMO layer quantity being 24 or less and that is in the baseband capabilities. For example, in FIG. 6, only a first combination of baseband capabilities and a second combination of baseband capabilities are reported.

Optionally, the baseband capability range may alternatively be another range formulated by a base station based on a status of the base station. This is not limited in this embodiment of this application.

In another optional embodiment, the second information may implicitly indicate the baseband capability range. To be specific, the second information includes a carrier aggregation combination range that the terminal device is requested to report, and the carrier aggregation combination range includes at least one of a requested maximum MIMO layer quantity, a requested maximum CSI process quantity, a requested band in which the carrier in the carrier aggregation combination is located, a requested maximum bandwidth of carriers in the carrier aggregation combination, and a requested maximum quantity of the carriers in the carrier aggregation combination.

Specifically, that the terminal device determines the baseband capabilities based on the second information includes that the terminal device determines the carrier aggregation capability based on the carrier aggregation combination range, where the carrier aggregation capability meets the carrier aggregation combination range; determines the baseband capability range based on the carrier aggregation capability, where the baseband capability range includes at least one of a requested maximum MIMO layer quantity, a requested maximum MIMO layer quantity that is supported on the carrier, a requested maximum CSI process quantity, a requested maximum CSI process quantity that is supported on the carrier, a requested maximum bandwidth of the carrier aggregation combination, a requested maximum bandwidth of carriers in the carrier aggregation combination, and a requested maximum quantity of the carriers in the carrier aggregation combination; and determines the baseband capabilities based on the baseband capability range, where the baseband capabilities meet the baseband capability range.

For example, a carrier aggregation combination range may include Band A and Band B, a quantity of carriers is four or less, and a bandwidth of each carrier is 20 M or less. In this case, the terminal device may determine, based on the carrier aggregation combination range, that the carrier aggregation combination may include at least one carrier aggregation combination of Band A [2*20]+Band B [2*20], Band A [1*20]+Band B [2*20], Band A [2*20]+Band B [1*20], Band A [1*20]+Band B [1*20], Band A [2*10]+Band B [1*10], Band A [1*10]+Band B [1*20], and the like.

The terminal device may determine the baseband capability range based on the foregoing carrier aggregation combination. The baseband capability range may include, for example, at least one of ranges such as that a requested maximum bandwidth of the carrier aggregation combination is 80 M, that a requested maximum bandwidth of carriers in the carrier aggregation combination is 20 M, that a requested maximum MIMO layer quantity that is supported on the carrier is two, and a requested maximum quantity of the carriers in the carrier aggregation combination is five. The terminal device determines the reported baseband capability based on the baseband capability range.

Similarly, the request message sent by the network device to the terminal device may further carry third information, where the third information is used to indicate an antenna capability range. Correspondingly, the terminal device receives the request message sent by the network device. In S210, that the terminal device determines the carrier aggregation capability and the baseband capabilities of the terminal device may be that the terminal device determines the antenna capability based on the antenna capability range, where the antenna capability meets the antenna capability range indicated by the third information.

Optionally, the antenna capability range may include a band range.

Optionally, that the terminal device determines the baseband capabilities based on the second information, and sends the baseband capabilities to the network device may be that the terminal device sends the baseband capabilities and the second information to the network device.

After obtaining capability information (including the reported carrier aggregation capability and baseband capabilities) of the terminal device, the network device stores the capability information and forwards the capability information to another network device. Therefore, adding the second information to the capability information can enable the another network device to learn that the baseband capabilities are reported based on the second information, so that the another network device determines whether a capability of the terminal device needs to be re-requested. For example, the network device requests the terminal device to report a baseband capability indicating four or less layers of MIMO, and forwards the obtained capability to another network device. If the another network device supports more layers of MIMO and knows that the capability is reported according to a requirement of the four layers of MIMO, the another network device may request the terminal device to report more capabilities.

Figures 9, 10:
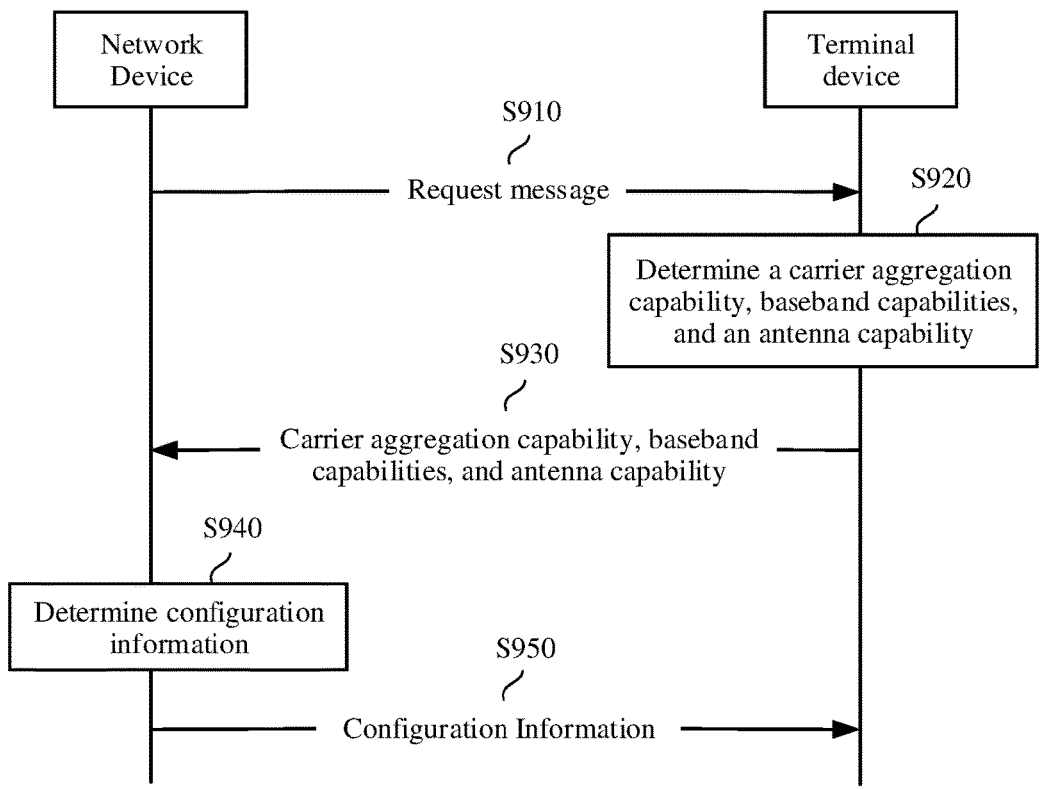
FIG. 9 is a schematic flowchart of another information transmission method according to an embodiment of this application.
FIG. 10 is a schematic diagram of another antenna capability according to an embodiment of this application.

FIG. 9 is a schematic flowchart of an information transmission method 900 according to an embodiment of this application. The method 900 may be applied to the communications system shown in FIG. 1. This is not limited in the embodiments of this application.

S910: A network device sends a request message to a terminal device, where the request message is used to request to report a capability of the terminal device; correspondingly, the terminal device receives the request message sent by the network device.

S920: The terminal device determines a carrier aggregation capability, baseband capabilities, and an antenna capability of the terminal device based on the request message, where the carrier aggregation capability includes a quantity of carriers and a bandwidth of a carrier in a carrier aggregation combination supported by the terminal device, the baseband capabilities include at least one of a MIMO capability and a CSI capability, the MIMO capability is used to indicate a quantity of MIMO layers that can be processed by the terminal device, the CSI capability is used to indicate a quantity of CSI processes that can be processed by the terminal device, and the antenna capability is used to indicate at least one of an antenna quantity supported by the terminal device in each of at least one band and a total antenna quantity supported by the terminal device in each of at least one band combination.

S930: The terminal device sends the carrier aggregation capability, the baseband capabilities, and the antenna capability to the network device; correspondingly, the network device receives the carrier aggregation capability, the baseband capabilities, and the antenna capability that are sent by the terminal device.

S940: The network device determines configuration information of the terminal device based on the carrier aggregation capability, the baseband capabilities, and the antenna capability, where the configuration information is used to configure a target baseband capability used by the terminal device when the terminal device works on each carrier in the carrier aggregation combination.

It should be understood that the target baseband capability in this embodiment of this application may be at least one of a MIMO layer quantity and a CSI process quantity on each carrier that are configured by the network device for the terminal device.

Optionally, the network device determines configuration information of the terminal device based on the carrier aggregation capability, the baseband capabilities, and the antenna capability and depending on whether the carriers in the carrier aggregation combination are contiguous carriers, where the configuration information is used to configure the target baseband capability used by the terminal device when the terminal device works on the carrier in the carrier aggregation combination.

S950: The network device sends the configuration information to the terminal device; correspondingly, the terminal device receives the configuration information sent by the network device.

In an optional embodiment, the terminal device determines, based on the request message, that the carrier aggregation capability of the terminal device includes a carrier aggregation combination 1 includes Band 1 [2*20 M], Band 2 [2*20 M], and Band 3 [2*40 M], that the baseband capabilities are shown in FIG. 6, and that the antenna capability is shown in FIG. 10, and reports the carrier aggregation combination 1, the baseband capabilities, and the antenna capability to the network device.

(1) It is assumed that the terminal device determines, based on that a total bandwidth of the carrier aggregation combination 1 is 2*20+2*20+2*40=160 M and the baseband capabilities shown in FIG. 6, that a maximum MIMO layer quantity of the terminal device on the carrier aggregation combination 1 is 24, and a maximum CSI process quantity of the terminal device on the carrier aggregation combination 1 is 10; or that a maximum MIMO layer quantity of the terminal device on the carrier aggregation combination 1 is 20, and a maximum CSI process quantity of the terminal device on the carrier aggregation combination 1 is 12.

(2) The network device determines, based on the carrier aggregation combination 1 and the antenna capability shown in FIG. 10, that an antenna quantity supported by the terminal device in Band 1 is four (that is, Band 1<4>), that an antenna quantity supported by the terminal device in Band 2 is four (that is, Band 2<4>), that an antenna quantity supported by the terminal device in Band 3 is eight (that is, Band 3<8>), and that a total antenna quantity supported on the carrier aggregation combination is 14. However, a total antenna quantity in the three bands is 4+4+8=16. Therefore, antennas configured for the three bands need to be reduced by two, for example, Band 1<2>, Band 2<4>, and Band 3<8>, or Band 1<4>, Band 2<2>, and Band 3<8>, or Band 1<4>, Band 2<4>, and Band 3<6>.

Optionally, the carrier capability may further carry information indicating whether the carriers are contiguous.

(3) It is assumed that it is learned, based on the antenna capability, that an antenna configuration is Band 1<4>, Band 2<4>, and Band 3<6>, and carriers in each of Band 1, Band 2, and Band 3 are contiguous. In this case, 2*4=8 layers of MIMO may be configured in Band 1, 2*4=8 layers of MIMO may be configured in Band 2, and 2*8=16 layers of MIMO may be configured in Band 3. Therefore, based on the antenna capability, the terminal device may be configured with 32 layers of MIMO in total in the three bands.

(4) In step (1), it is determined, based on the baseband capability, that the terminal device can be configured with a maximum of only 24 layers of MIMO or 20 layers of MIMO in the three bands. Therefore, a maximum of 20 layers of MIMO or 24 layers of MIMO needs to be finally configured based on a limitation on the baseband capability. For example:

Band 1 [2CC*4MIMO]+Band 2 [2CC*4MIMO]+ Band 3 [1CC*8MIMO+1CC], or

Band 1 [2CC*4MIMO]+Band 2 [2CC*4MIMO]+ Band 3 [2CC*4MIMO], or

Band 1 [2CC]+Band 2 [2CC*4MIMO]+Band 3 [2CC*8MIMO].

Correspondingly, a finally configured CSI capability only needs to be configured based on a maximum baseband capability.

In another optional embodiment, the terminal device determines, based on the request message, that the carrier aggregation capability of the terminal device includes a carrier aggregation combination 2 Band1 [40 M], Band 1 [2*20 M], and Band 3 [80 M], that the baseband capabilities are shown in FIG. 6, and that the antenna capability is shown in FIG. 10, and reports the carrier aggregation combination 2, the baseband capabilities, and the antenna capability to the network device.

(1) The terminal device determines, based on that a total bandwidth of the carrier aggregation combination 2 is 40+2*20+80=160 M and the baseband capabilities shown in FIG. 6, that a maximum MIMO layer quantity of the terminal device on the carrier aggregation combination 2 is 24, and that a maximum CSI process quantity of the terminal device on the carrier aggregation combination 2 is 10; or that a maximum MIMO layer quantity of the terminal device on the carrier aggregation combination 2 is 20, and a maximum CSI process quantity of the terminal device on the carrier aggregation combination 2 is 12.

(2) The network device determines, based on the carrier aggregation combination 2 and the antenna capability shown in FIG. 10, that an antenna quantity supported by the terminal device in Band 1 is four (that is, Band 1<4>), that an antenna quantity supported by the terminal device in Band 3 is eight (that is, Band 3<8>), and that a total antenna quantity supported on the carrier aggregation combination is 14. However, a total antenna quantity in the three bands is 4+0+8=12. Therefore, an antenna quantity may be configured for all of the three bands based on a maximum capability, for example, Band 1<2>, Band 1<2>, and Band 3<8>, or Band 1<4>, Band 1<0>, and Band 3<8>, or Band 1<0>, Band 1<4>, and Band 3<8>.

Optionally, the carrier capability may further carry information indicating whether the carriers are contiguous.

(3) It is assumed that it is learned, based on the antenna capability, that an antenna configuration is Band 1<2>, Band 1<2>, and Band 3<8>, the first Band 1 includes one carrier, the second Band 1 includes two carriers, noncontiguous carriers in Band 1 include the first carrier and the two carriers following the first carrier in Band 1, and Band 3 includes one carrier. In this case, 1*2=2 layers of MIMO may be configured on the carrier in the first Band 1, 2*2=4 layers of MIMO may be configured on the two carriers in the second Band 1, and 1*8=8 layers of MIMO may be configured on the carrier in Band 3. Therefore, based on the antenna capability, the terminal device may be configured with 14 layers of MIMO in the three bands.

(4) In step (1), it is determined, based on the baseband capability, that the terminal device can be configured with a maximum of 24 layers of MIMO or 20 layers of MIMO in the three bands. Therefore, 14 layers of MIMO need to be finally configured based on a limitation on the antenna capability. For example:

Band 1 [1CC*2MIMO]+Band 1 [2CC*2MIMO]+ Band 2 [1CC*8MIMO].

Correspondingly, a finally configured CSI capability only needs to be configured based on a maximum capability that corresponds to the 14 layers of MIMO and that is in the baseband capabilities.

The foregoing describes the information transmission method provided in the embodiments of this application in detail with reference to FIG. 1 to FIG. 10. The following describes a terminal device and a network device that are provided in the embodiments of this application with reference to FIG. 11 to FIG. 14.

Figure 11:
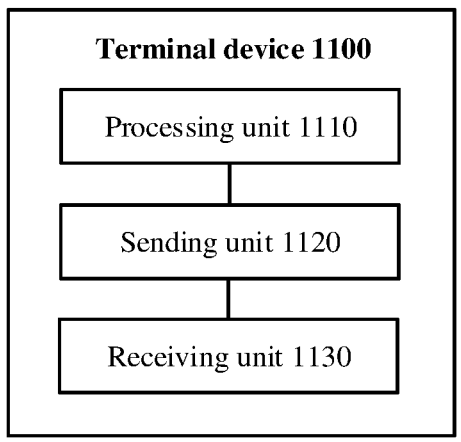
FIG. 11 is a schematic block diagram of a terminal device according to an embodiment of this application.

FIG. 11 is a schematic block diagram of a terminal device 1100 according to an embodiment of this application. The terminal device 1100 includes:

a processing unit 1110, configured to determine a carrier aggregation capability and baseband capabilities of the terminal device, where the carrier aggregation capability includes a quantity of carriers and a bandwidth of a carrier in a carrier aggregation combination supported by the terminal device, the baseband capabilities include at least one of a multiple-input multiple-output (MIMO) capability and a channel state information (CSI) capability, the MIMO capability is used to indicate a quantity of MIMO layers that can be processed by the terminal device, and the CSI capability is used to indicate a quantity of CSI processes that can be processed by the terminal device;

a sending unit 1120, configured to send, to a network device, the carrier aggregation capability and the baseband capabilities that are determined by the processing unit 1110; and a receiving unit 1130, configured to receive configuration information sent by the network device based on the carrier aggregation capability and the baseband capabilities that are sent by the sending unit 1120, where the configuration information is used to configure a target baseband capability used by the terminal device when the terminal device works on each carrier in the carrier aggregation combination.

Optionally, the processing unit is further configured to determine an antenna capability of the terminal device, where the antenna capability is used to indicate at least one of an antenna quantity supported by the terminal device in each of at least one band and a total antenna quantity supported by the terminal device in each of at least one band combination; the sending unit is specifically configured to send the carrier aggregation capability, the baseband capabilities, and the antenna capability to the network device; and the receiving unit is specifically configured to receive the configuration information sent by the network device based on the carrier aggregation capability, the baseband capabilities, and the antenna capability.

Optionally, the baseband capabilities include the MIMO capability; the processing unit is further configured to determine whether a MIMO capability supported by the terminal device on each carrier in the carrier aggregation combination can reach the MIMO capability indicated by the baseband capabilities; and the sending unit is specifically configured to: send the carrier aggregation capability and the baseband capabilities to the network device when the MIMO capability supported by the terminal device on the carrier in the carrier aggregation combination can reach the MIMO capability indicated by the baseband capabilities, where the carrier aggregation capability does not include the MIMO capability supported by the terminal device on any carrier in the carrier aggregation combination; or send the carrier aggregation capability and the baseband capabilities to the network device when a MIMO capability supported by the terminal device on a first carrier in the carrier aggregation combination cannot reach the MIMO capability indicated by the baseband capabilities, where the carrier aggregation capability further includes the MIMO capability supported by the terminal device on the first carrier.

Optionally, the receiving unit is further configured to receive, before the processing unit determines the carrier aggregation capability and the baseband capabilities of the terminal device, a request message sent by the network device, where the request message carries second information, and the second information is used by the terminal device to determine a baseband capability range to be reported; and the processing unit is specifically configured to determine the baseband capabilities based on the second information, where the baseband capabilities meet the baseband capability range determined by the terminal device based on the second information.

Optionally, the second information includes a carrier aggregation combination range that the terminal device is requested to report, and the carrier aggregation combination range includes at least one of a requested maximum MIMO layer quantity, a requested maximum CSI process quantity, a requested band in which the carrier in the carrier aggregation combination is located, a requested maximum bandwidth of carriers in the carrier aggregation combination, and a requested maximum quantity of the carriers in the carrier aggregation combination; and the processing unit is specifically configured to: determine the carrier aggregation capability based on the carrier aggregation combination range, where the carrier aggregation capability meets the carrier aggregation combination range; determine the baseband capability range based on the carrier aggregation capability; and determine the baseband capabilities based on the baseband capability range, where the baseband capabilities meet the baseband capability range.

Optionally, the second information includes a baseband capability range that the terminal device is requested to report, and the baseband capability range includes at least one of a requested maximum MIMO layer quantity, a requested maximum MIMO layer quantity that is supported on the carrier, a requested maximum CSI process quantity, a requested maximum CSI process quantity that is supported on the carrier, a requested maximum bandwidth of carriers in the carrier aggregation combination, and a requested maximum quantity of the carriers in the carrier aggregation combination.

Optionally, the baseband capabilities include a baseband capability of the terminal device on a carrier aggregation combination corresponding to each of at least one total bandwidth and a baseband capability of the terminal device on each carrier in the carrier aggregation combination corresponding to the total bandwidth, and the total bandwidth is a sum of bandwidths of all carriers in a carrier aggregation combination including at least one carrier.

Optionally, information about the baseband capabilities includes a baseband capability of the terminal device with regard to each of at least one class of carrier information, and the carrier information includes a quantity of carriers and a bandwidth of a carrier.

It should be understood that the terminal device 1100 herein is embodied in a form of a functional unit. The term "unit" herein may be an application-specific integrated circuit (application specific integrated circuit, ASIC), an electronic circuit, a processor (for example, a shared processor, a dedicated processor, or a group processor) configured to execute one or more software or firmware programs, a memory, a merged logic circuit, and/or another suitable component that supports the described function. In an optional example, a person skilled in the art may understand that the terminal device 1100 may be specifically the terminal device in the embodiments of the method 200 and the method 900, and the terminal device 1100 may be configured to perform procedures and/or steps corresponding to the terminal device in the method embodiments of the method 200 and the method 900. To avoid repetition, details are not described herein again.

Figure 12:
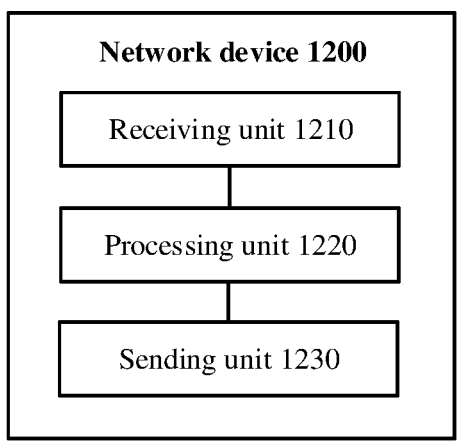
FIG. 12 is a schematic block diagram of a network device according to an embodiment of this application.

FIG. 12 is a schematic block diagram of a network device 1200 according to an embodiment of this application. The network device 1200 includes:

a receiving unit 1210, configured to receive a carrier aggregation capability and baseband capabilities of a terminal device that are sent by the terminal device, where the carrier aggregation capability includes a quantity of carriers and a bandwidth of a carrier in a carrier aggregation combination supported by the terminal device, the baseband capabilities include at least one of a multiple-input multiple-output (MIMO) capability and a channel state information (CSI) capability, the MIMO capability is used to indicate a quantity of MIMO layers that can be processed by the terminal device, and the CSI capability is used to indicate a quantity of CSI processes that can be processed by the terminal device;

a processing unit 1220, configured to determine configuration information of the terminal device based on the carrier aggregation capability and the baseband capabilities that are received by the receiving unit 1210, where the configuration information is used to configure a target baseband capability used by the terminal device when the terminal device works on each carrier in the carrier aggregation combination; and a sending unit 1230, configured to send, to the terminal device, the configuration information determined by the processing unit 1220.

Optionally, the receiving unit is further configured to receive an antenna capability sent by the terminal device, where the antenna capability is used to indicate at least one of an antenna quantity supported by the terminal device in each of at least one band and a total antenna quantity supported by the terminal device in each of at least one band combination; and the processing unit is specifically configured to determine the configuration information of the terminal device based on the carrier aggregation capability, the baseband capabilities, and the antenna capability.

Optionally, the sending unit is further configured to send a request message to the terminal device before the network device receives the carrier aggregation capability and the baseband capabilities of the terminal device that are sent by the terminal device, where the request message carries second information, and the second information is used by the terminal device to determine a baseband capability range to be reported; and the receiving unit is specifically configured to receive the carrier aggregation capability and the baseband capabilities of the terminal device that are sent by the terminal device based on the second information.

Optionally, the second information includes a carrier aggregation combination range that the terminal device is requested to report, and the carrier aggregation combination range includes at least one of a requested maximum MIMO layer quantity, a requested maximum CSI process quantity, a requested band in which the carrier in the carrier aggregation combination is located, a requested maximum bandwidth of carriers in the carrier aggregation combination, and a requested maximum quantity of the carriers in the carrier aggregation combination.

Optionally, the second information includes a baseband capability range that the terminal device is requested to report, and the baseband capability range includes at least one of a requested maximum MIMO layer quantity, a requested maximum MIMO layer quantity that is supported on the carrier, a requested maximum CSI process quantity, a requested maximum CSI process quantity that is supported on the carrier, a requested maximum bandwidth of carriers in the carrier aggregation combination, and a requested maximum quantity of the carriers in the carrier aggregation combination.

Optionally, the baseband capabilities include a baseband capability of the terminal device on a carrier aggregation combination corresponding to each of at least one total bandwidth and a baseband capability of the terminal device on each carrier in the carrier aggregation combination corresponding to the total bandwidth, and the total bandwidth is a sum of bandwidths of all carriers in a carrier aggregation combination including at least one carrier.

Optionally, information about the baseband capabilities includes a baseband capability of the terminal device with regard to each of at least one class of carrier information, and the carrier information includes a quantity of carriers and a bandwidth of a carrier.

It should be understood that the network device 1200 herein is embodied in a form of a functional unit. The term "unit" herein may be an ASIC, an electronic circuit, a processor (for example, a shared processor, a dedicated processor, or a group processor) configured to execute one or more software or firmware programs, a memory, a merged logic circuit, and/or another suitable component that supports the described function. In an optional example, a person skilled in the art may understand that the network device 1200 may be specifically the network device in the embodiments of the method 200 and the method 900, and the network device 1200 may be configured to perform procedures and/or steps corresponding to the network device in the method embodiments of the method 200 and the method 900. To avoid repetition, details are not described herein again.

Figure 13:
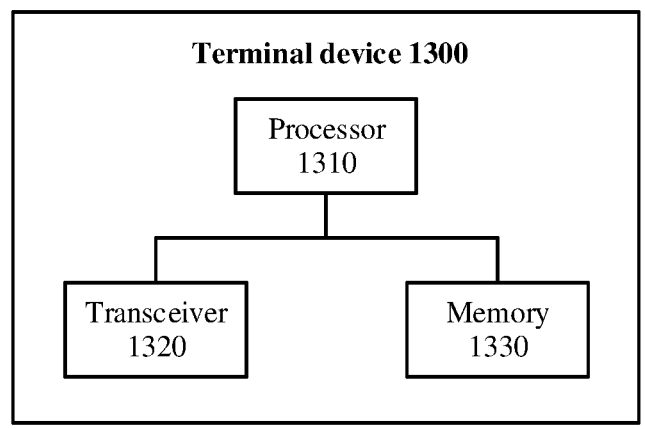
FIG. 13 is a schematic block diagram of another terminal device according to an embodiment of this application.

FIG. 13 shows a terminal device 1300 according to an embodiment of this application. The terminal device 1300 may be the terminal device in FIG. 1, FIG. 2, and FIG. 13. A hardware architecture shown in FIG. 13 may be used for the terminal device. The terminal device may include a processor 1310, a transceiver 1320, and a memory 1330. The processor 1310, the transceiver 1320, and the memory 1330 communicate with each another by using internal connection paths. Related functions implemented by the processing unit 1110 in FIG. 11 may be implemented by the processor 1310, and related functions implemented by the sending unit 1120 and the receiving unit 1130 may be implemented by the processor 1310 by controlling the transceiver 1320.

The processor 1310 may include one or more processors, for example, include one or more central processing units (CPUs). When the processor is one CPU, the CPU may be a single-core CPU or a multi-core CPU.

The transceiver 1320 is configured to send and receive data and/or a signal, and receive data and/or a signal. The transceiver may include a transmitter and a receiver. The transmitter is configured to send data and/or a signal, and the receiver is configured to receive data and/or a signal.

The memory 1330 includes but is not limited to a random access memory (RAM), a read-only memory (ROM), an erasable programmable memory (erasable programmable read only memory, EPROM), and a compact disc read-only memory (CD-ROM). The memory 1330 is configured to store a related instruction and data.

The memory 1330 is configured to store program code and data of the terminal device, and may be a separate device or integrated into the processor 1310.

Specifically, the processor 1310 is configured to control the transceiver to perform information transmission with a network device. For details, refer to the description in the method embodiments. Details are not described herein again.

It may be understood that FIG. 13 shows only a simplified design of the terminal device. During actual application, the terminal device may also include other necessary components, including but not limited to any quantity of transceivers, processors, controllers, memories, and the like, and all terminal devices that can implement this application shall fall within the protection scope of this application.

In a possible design, the terminal device 1300 may be replaced with a chip apparatus, for example, may be a communications chip available for the terminal device and configured to implement a related function of the processor 1310 in the terminal device. The chip apparatus may be a field programmable gate array, a dedicated integrated chip, a system chip, a central processing unit, a network processor, a digital signal processing circuit, or a microcontroller that is for implementing related functions, or may be a programmable controller or another integrated chip. Optionally, the chip may include one or more memories, configured to store program code. When the code is executed, the processor is enabled to implement a corresponding function.

Figure 14:
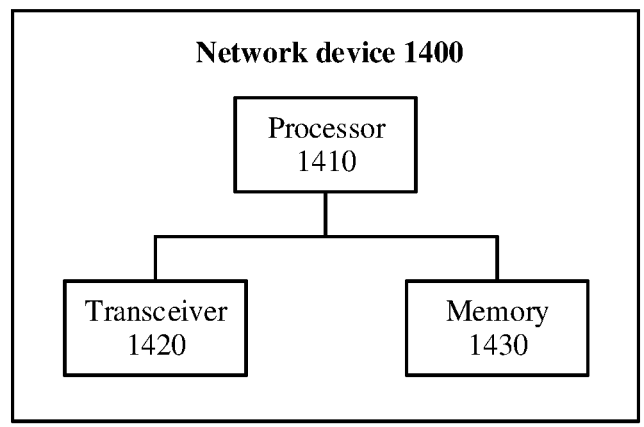
FIG. 14 is a schematic block diagram of another network device according to an embodiment of this application.

FIG. 14 shows a network device 1400 according to an embodiment of this application. The network device 1400 may be the network device in FIG. 1 to FIG. 4, and a hardware architecture shown in FIG. 14 may be used for the network device. The network device may include a processor 1410, a transceiver 1420, and a memory 1430. The processor 1410, the transceiver 1420, and the memory 1430 communicate with each another by using internal connection paths. Related functions implemented by the processing unit 1220 in FIG. 12 may be implemented by the processor 1410, and related functions implemented by the receiving unit 1210 and the sending unit 1230 may be implemented by the processor 1410 by controlling the transceiver 1420.

The processor 1410 may include one or more processors, for example, include one or more CPUs. When the processor is one CPU, the CPU may be a single-core CPU or a multi-core CPU.

The transceiver 1420 is configured to send and receive data and/or a signal, and receive data and/or a signal. The transceiver may include a transmitter and a receiver. The transmitter is configured to send data and/or a signal, and the receiver is configured to receive data and/or a signal.

The memory 1430 includes but is not limited to a RAM, a ROM, an EPROM, and a CD-ROM. The memory 1430 is configured to store a related instruction and data.

The memory 1430 is configured to store program code and data of the network device, and may be a separate device or integrated into the processor 1410.

Specifically, the processor 1410 is configured to control the transceiver to perform information transmission with a terminal device. For details, refer to the description in the method embodiments. Details are not described herein again.

It may be understood that FIG. 14 shows only a simplified design of the network device. During actual application, the network device may also include other necessary components, including but not limited to any quantity of transceivers, processors, controllers, memories, and the like, and all network devices that can implement this application shall all fall within the protection scope of this application.

In a possible design, the network device 1400 may be replaced with a chip apparatus, for example, may be a communications chip available for the network device and configured to implement a related function of the processor 1410 in the network device. The chip apparatus may be a field programmable gate array, a dedicated integrated chip, a system chip, a central processing unit, a network processor, a digital signal processing circuit, or a microcontroller that is for implementing related functions, or may be a programmable controller or another integrated chip. Optionally, the chip may include one or more memories, configured to store program code. When the code is executed, the processor is enabled to implement a corresponding function.

An embodiment of this application further provides a communications apparatus. The communications apparatus may be a terminal device, or may be a circuit. The communications apparatus may be configured to perform an action performed by the terminal device in the foregoing method embodiments.

Figure 15:
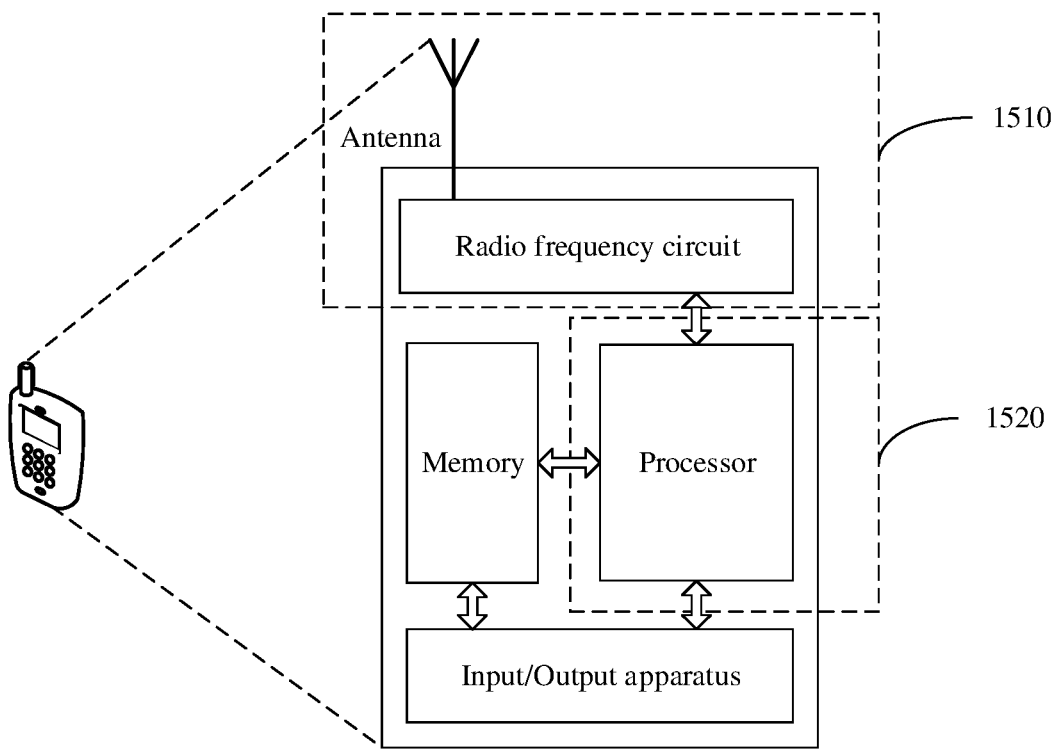
FIG. 15 is a schematic block diagram of a communications apparatus according to an embodiment of this application.

When the communication apparatus is a terminal device, FIG. 15 is a simplified schematic structural diagram of the terminal device. For ease of understanding and illustration, an example in which the terminal device is a mobile phone is used in FIG. 15. As shown in FIG. 15, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is mainly configured to store software program and data. The radio frequency circuit is mainly configured to perform conversion between a baseband signal and a radio frequency signal, and process the radio frequency signal. The antenna is mainly configured to transmit and receive a radio frequency signal in an electromagnetic wave form. The input/output apparatus such as a touchscreen, a display screen, or a keyboard is mainly configured to receive data entered by a user and data output to the user. It should be noted that some types of terminal devices may not have the input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 15 shows merely one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a sending and receiving function may be considered as a transceiver unit of the terminal device, and the processor that has a processing function may be considered as a processing unit of the terminal device. As shown in FIG. 15, the terminal device includes a transceiver unit 1510 and a processing unit 1520. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 1510 and that is configured to implement a receiving function may be considered as a receiving unit, and a component that is in the transceiver unit 1510 and that is configured to implement a sending function may be considered as a sending unit. That is, the transceiver unit 1510 includes the receiving unit and the sending unit. The transceiver unit sometimes may also be referred to as a transceiver, a transceiver, a transceiver circuit, or the like. The receiving unit sometimes may also be referred to as a receiver, a receiver, a receiving circuit, or the like. The sending unit sometimes may also be referred to as a transmitter, a transmitter, a transmitting circuit, or the like.

It should be understood that the transceiver unit 1510 is configured to perform a sending operation and a receiving operation on a terminal device side in the foregoing method embodiments, and the processing unit 1520 is configured to perform another operation excluding the receiving operation and the sending operation of the terminal device in the foregoing method embodiments.

For example, in an implementation, the transceiver unit 1510 is configured to perform the sending operation on the terminal device side in step S220 or the receiving operation on the terminal device side in step S240 in FIG. 2, and/or the transceiver unit 1510 is further configured to perform other receiving and sending steps on the terminal device side in the embodiments of this application. The processing unit 1520 is configured to perform step S210 in FIG. 2, and/or the processing unit 1520 is further configured to perform another processing step on the terminal device side in the embodiments of this application.

For another example, in another implementation, the transceiver unit 1510 is configured to perform the receiving operations on the terminal device side in step S910 and step S950 in FIG. 9 or the sending operation on the terminal device side in step S930, and/or the transceiver unit 1520 is further configured to perform other receiving and sending steps on the terminal device side in the embodiments of this application. The processing unit 1520 is configured to perform step S920 in FIG. 9, and/or the processing unit 1520 is further configured to perform another processing step on the terminal device side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 16:
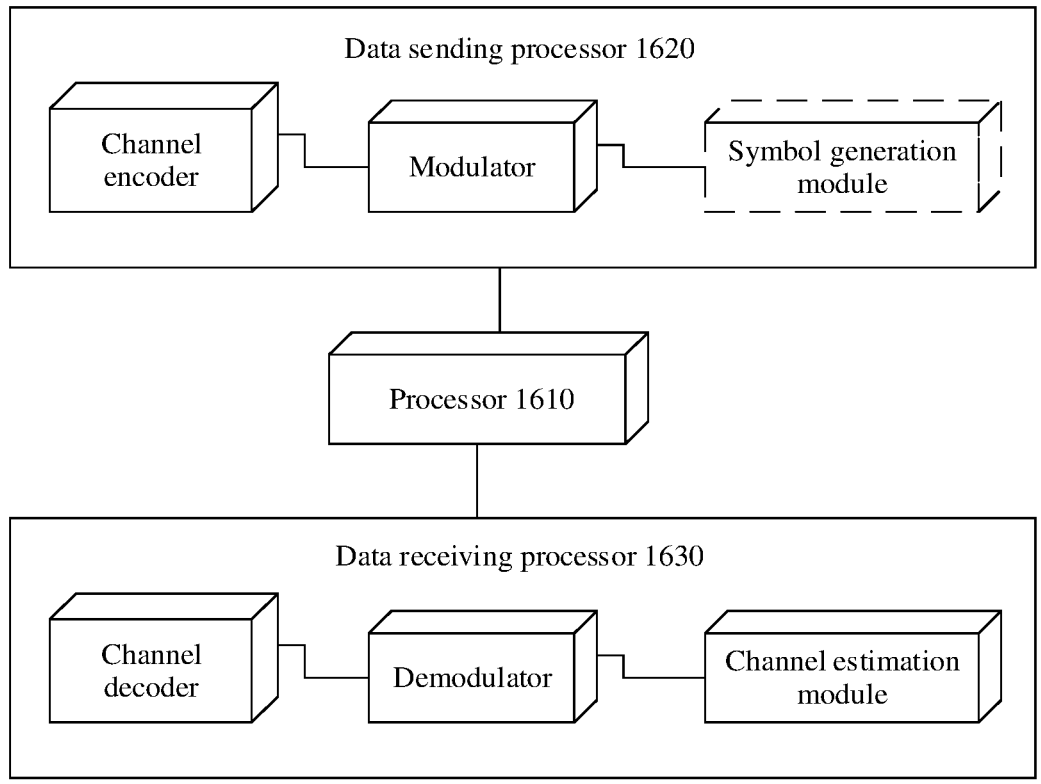
FIG. 16 is another schematic block diagram of a communications apparatus according to an embodiment of this application.

When the communications apparatus in this embodiment is a terminal device, refer to a device shown in FIG. 16. In an example, the device may complete a function similar to that of the processor 1310 in FIG. 13. In FIG. 16, the device includes a processor 1610, a data sending processor 1620, and a data receiving processor 1630. The processor 1110 in the foregoing embodiment may be the processor 1610 in FIG. 16, and completes a corresponding function. The sending unit 1120 in the foregoing embodiment may be the data sending processor 1620 in FIG. 16, and the receiving unit 1130 may be the data receiving processor 1630 in FIG. 16. Although FIG. 16 shows a channel encoder and a channel decoder, it may be understood that the modules are merely examples, and do not constitute a limitation on this embodiment.

Figure 17:
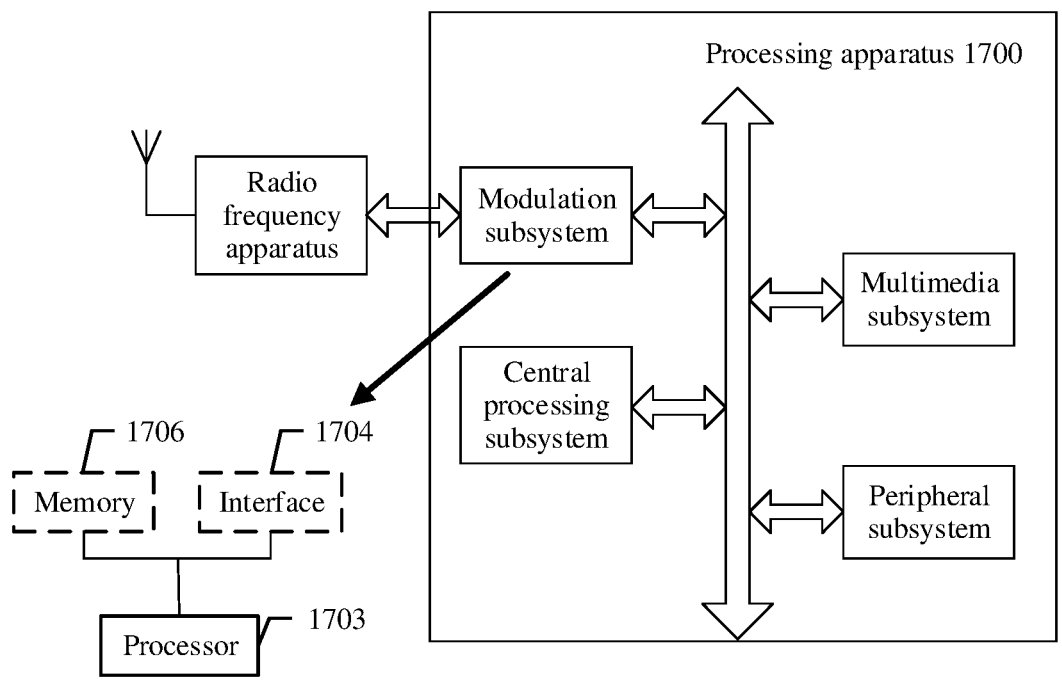
FIG. 17 is still another schematic block diagram of a communications apparatus according to an embodiment of this application.

FIG. 17 shows another form of this embodiment. A processing apparatus 1700 includes modules such as a modulation subsystem, a central processing subsystem, and a peripheral subsystem. A communications apparatus in this embodiment may be used as the modulation subsystem in the processing apparatus 1700. Specifically, the modulation subsystem may include a processor 1703 and an interface 1704. The processor 1703 completes a function of the foregoing processing unit 1110, and the interface 1704 completes a function of the foregoing sending unit 1120 and/or receiving unit 1130. In another variation, the modulation subsystem includes a memory 1706, a processor 1703, and a program that is stored in the memory 1706 and that can be run on the processor. When executing the program, the processor 1703 implements the method on a terminal device side in the foregoing method embodiments. It should be noted that the memory 1706 may be non-volatile, or may be volatile. The memory 1706 may be located in the modulation subsystem, or may be located in the processing apparatus 1700, as long as the memory 1206 can be connected to the processor 1703.

In another form of this embodiment, a computer-readable storage medium is provided. The computer-readable storage medium stores an instruction. When the instruction is executed, the method on the terminal device side in the foregoing method embodiments is performed.

In another form of this embodiment, a computer program product that includes an instruction is provided. When the instruction is executed, the method on the terminal device side in the foregoing method embodiments is performed.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by a terminal device, a request message, wherein the request message carries information comprising a carrier aggregation band combination range, and the carrier aggregation band combination range comprises at least one of a requested band in which a carrier in a carrier aggregation band combination is located, a requested maximum bandwidth of carriers in the carrier aggregation band combination, and a requested maximum quantity of carriers in the carrier aggregation band combination;
determining, by the terminal device, a carrier aggregation capability and baseband capabilities of the terminal device, wherein the carrier aggregation capability indicates a quantity of the carriers in the carrier aggregation band combination supported by the terminal device and indicates a bandwidth of each carrier in the carrier aggregation band combination, and the baseband capabilities comprise a first multiple-input multiple-output (MIMO) capability, and the first MIMO capability indicates a first quantity of MIMO layers that is capable of being processed by the terminal device;
sending, by the terminal device, information of the carrier aggregation capability and the baseband capabilities to a network device; and
receiving, by the terminal device from the network device in response to sending the information of the carrier aggregation capability and the baseband capabilities, configuration information, wherein the configuration information is based on the information of the carrier aggregation capability and the baseband capabilities; and
wherein determining the carrier aggregation capability and the baseband capabilities of the terminal device comprises:
determining the carrier aggregation capability, wherein the carrier aggregation capability meets the carrier aggregation band combination range, and the carrier aggregation capability comprises the carrier aggregation band combination;
determining a baseband capability range based on the carrier aggregation band combination; and
determining the baseband capabilities, wherein the baseband capabilities meet the baseband capability range, and the baseband capabilities correspond to each of at least one class of carrier information, and each of the at least one class of carrier information comprises a quantity of carriers and a bandwidth of a carrier.

2. The method according to claim 1, further comprising:
determining, by the terminal device, whether a second MIMO capability supported by the terminal device on each carrier in the carrier aggregation band combination matches the first MIMO capability indicated by the baseband capabilities, wherein the second MIMO capability indicates a quantity of MIMO layers; and
wherein sending, by the terminal device, the information of the carrier aggregation capability and the baseband capabilities comprises:
sending the information of the carrier aggregation capability and the baseband capabilities to the network device, when the terminal device determines that the second MIMO capability supported by the terminal device on each carrier in the carrier aggregation band combination matches the first MIMO capability indicated by the baseband capabilities, wherein the carrier aggregation capability does not comprise the second MIMO capability supported by the terminal device on any carrier in the carrier aggregation band combination; or
sending the information of the carrier aggregation capability and the baseband capabilities to the network device when the terminal device determines that the second MIMO capability supported by the terminal device on a carrier in the carrier aggregation band combination does not match the first MIMO capability indicated by the baseband capabilities, wherein the carrier aggregation capability further comprises the second MIMO capability supported by the terminal device on the carrier.

3. A terminal device comprising:
a receiving unit, configured to receive a request message, wherein the request message carries information comprising a carrier aggregation band combination range, and the carrier aggregation band combination range comprises at least one of a requested band in which a carrier in a first carrier aggregation band combination is located, a requested maximum bandwidth of carriers in the first carrier aggregation band combination, and a requested maximum quantity of carriers in the first carrier aggregation band combination; and
a processing unit, configured to determine a carrier aggregation capability and baseband capabilities of the terminal device, wherein the carrier aggregation capability indicates a quantity of the carriers in the carrier aggregation band combination supported by the terminal device and indicates a bandwidth of each carrier in the carrier aggregation band combination, and the baseband capabilities comprise a first multiple-input multiple-output (MIMO) capability, and the first MIMO capability indicates a first quantity of MIMO layers that is capable of being processed by the terminal device; and
wherein the sending unit is further configured to send to a network device, information of the carrier aggregation capability and the baseband capabilities that are determined by the processing unit;
the terminal device further comprises a receiving unit, configured to receive, in response to the sending unit sending the information of the carrier aggregation capability and the baseband capabilities, configuration information, wherein the configuration information is based on the information of the carrier aggregation capability and the baseband capabilities; and
the processing unit is specifically configured to:
determine the carrier aggregation capability, wherein the carrier aggregation capability meets the carrier aggregation band combination range, and the carrier aggregation capability comprises the carrier aggregation band combination;
determine a baseband capability range based on the carrier aggregation band combination; and
determine the baseband capabilities, wherein the baseband capabilities meet the baseband capability range, and the baseband capabilities correspond to each of at least one class of carrier information, and each of the at least one class of carrier information comprises a quantity of carriers and a bandwidth of a carrier.

4. The terminal device according to claim 3, wherein the processing unit is further configured to determine whether a second MIMO capability supported by the terminal device on each carrier in the carrier aggregation band combination matches the first MIMO capability indicated by the baseband capabilities, wherein the second MIMO capability indicates a quantity of MIMO layers; and the sending unit is further configured to:

send the information of the carrier aggregation capability and the baseband capabilities to the network device when the second MIMO capability supported by the terminal device on the carrier in the carrier aggregation band combination matches the first MIMO capability indicated by the baseband capabilities, wherein the carrier aggregation capability does not comprise the second MIMO capability supported by the terminal device on any carrier in the carrier aggregation band combination; or send the information of the carrier aggregation capability and the baseband capabilities to the network device when the second MIMO capability supported by the terminal device on a carrier in the carrier aggregation band combination does not match the first MIMO capability indicated by the baseband capabilities, wherein the carrier aggregation capability further comprises the second MIMO capability supported by the terminal device on the carrier.

5. A device comprising:

a non-transitory memory storage comprising instructions; and one or more processors in communication with the memory storage, wherein the instructions, when executed by the one or more processors, cause the device to perform:

receiving a request message, wherein the request message carries information comprising a carrier aggregation band combination range, and the carrier aggregation band combination range comprises at least one of a requested band in which a carrier in a carrier aggregation band combination is located, a requested maximum bandwidth of carriers in the carrier aggregation band combination, and a requested maximum quantity of carriers in the carrier aggregation band combination;

determining a carrier aggregation capability and baseband capabilities of the device, wherein the carrier aggregation capability indicates a quantity of the carriers in the carrier aggregation band combination supported by the device and indicates a bandwidth of each carrier in the carrier aggregation band combination, and the baseband capabilities comprise a first multiple-input multiple-output (MIMO) capability, and the first MIMO capability indicates a first quantity of MIMO layers that is capable of being processed by the device;

sending information of the carrier aggregation capability and the baseband capabilities to a network device; and receiving, from the network device in response to sending the information of the carrier aggregation capability and the baseband capabilities, configuration information, wherein the configuration information is based on the information of the carrier aggregation capability and the baseband capabilities; and wherein determining the carrier aggregation capability and the baseband capabilities of the device comprises:

determining the carrier aggregation capability, wherein the carrier aggregation capability meets the carrier aggregation band combination range, and the carrier aggregation capability comprises the carrier aggregation band combination;

determining a baseband capability range based on the carrier aggregation band combination; and determining the baseband capabilities, wherein the baseband capabilities meet the baseband capability range, and the baseband capabilities corresponds to each of at least one class of carrier information, and each of the at least one class of carrier information comprises a quantity of carriers and a bandwidth of a carrier.

6. The device according to claim 5, wherein the instructions, when executed by the one or more processors, cause the device to further perform:

determining whether a second MIMO capability supported by the device on each carrier in the carrier aggregation band combination matches the first MIMO capability indicated by the baseband capabilities, wherein the second MIMO capability indicates a quantity of MIMO layers; and wherein sending the information of the carrier aggregation capability and the baseband capabilities comprises:

sending the information of the carrier aggregation capability and the baseband capabilities to the network device, when the device determines that the second MIMO capability supported by the device on each carrier in the carrier aggregation band combination matches the first MIMO capability indicated by the baseband capabilities, wherein the carrier aggregation capability does not comprise the second MIMO capability supported by the device on any carrier in the carrier aggregation band combination; or sending the information of the carrier aggregation capability and the baseband capabilities to the network device when the device determines that the second MIMO capability supported by the device on a carrier in the carrier aggregation band combination does not match the first MIMO capability indicated by the baseband capabilities, wherein the carrier aggregation capability further comprises the second MIMO capability supported by the device on the carrier.

* * * * *